United States Patent
Kühnel et al.

(10) Patent No.: US 7,207,324 B2
(45) Date of Patent: Apr. 24, 2007

(54) AIR-INTAKE DUCT SYSTEM FOR A COMBUSTION ENGINE

(75) Inventors: Hans-Ulrich Kühnel, Mönchengladbach (DE); Michael Sanders, Kaarst (DE); Armin Schürfeld, Meerbusch (DE); Dieter Thönnessen, Viersen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 10/595,147

(22) PCT Filed: Sep. 1, 2004

(86) PCT No.: PCT/EP2004/009713

§ 371 (c)(1),
(2), (4) Date: Mar. 6, 2006

(87) PCT Pub. No.: WO2005/024220

PCT Pub. Date: Mar. 17, 2005

(65) Prior Publication Data

US 2006/0283429 A1 Dec. 21, 2006

(30) Foreign Application Priority Data

Sep. 5, 2003  (DE) ............................... 103 41 393

(51) Int. Cl.
*F02M 25/07* (2006.01)
(52) U.S. Cl. .................... 123/568.12; 123/568.17; 123/184.43
(58) Field of Classification Search ........... 123/568.12, 123/568.17, 184.43, 184.61
See application file for complete search history.

(56) References Cited

U.S. PATENT DOCUMENTS 3,937,196 A * 2/1976 Cook et al. ............ 123/568.12
4,094,283 A * 6/1978 Sutton ................... 123/568.12
4,267,512 A * 5/1981 Rustenburg ................. 377/110

(Continued)

FOREIGN PATENT DOCUMENTS

EP          1059435 A2     12/2000

(Continued)

OTHER PUBLICATIONS

International Search Report in corresponding International Application No. PCT/EP2004/009713 completed Dec. 30, 2004 and mailed Jan. 21, 2005.

*Primary Examiner*—Stephen K. Cronin
*Assistant Examiner*—Arnold Castro
(74) *Attorney, Agent, or Firm*—Griffin & Szipl, P.C.

(57) ABSTRACT

The invention relates to an air-intake duct system (1) in which a throttle valve (40), an exhaust gas recirculating valve (29), a bypass valve (19), an exhaust gas cooler (11), against which exhaust gas flows via bypass valve (19), and, optionally, an air mass sensor are integrated. A complete intake unit for modern engines is hereby created, with which achieves a charging optimization and thus a reduction in fuel consumption as well as a reduction in pollutants by a corresponding thermal management in the engine by the exhaust gas cooler (11) that, together with a shell (3, 4) of the housing (2), is manufactured as a single piece. The individual add-on pieces (12, 19, 29, 40, 59) are optimally matched to one another and have, due to their designs, a low weight and a low finishing work requirement. This makes it possible to distinctly reduce assembly and manufacturing costs.

20 Claims, 5 Drawing Sheets

U.S. PATENT DOCUMENTS 6,311,678 B1 * 11/2001 Lepoutre ............... 123/568.12
2003/0010314 A1   1/2003 Brosseau et al.
2003/0047171 A1 * 3/2003 Vaughan et al. ....... 123/568.12
2003/0136368 A1 * 7/2003 Ausiello et al. ....... 123/184.21
2003/0150434 A1 * 8/2003 Leedham et al. ...... 123/568.12
2006/0124114 A1 * 6/2006 Sayers et al. .......... 123/568.12

FOREIGN PATENT DOCUMENTS

EP    1375896 A2   1/2004
EP    1479902 B1   8/2005

* cited by examiner

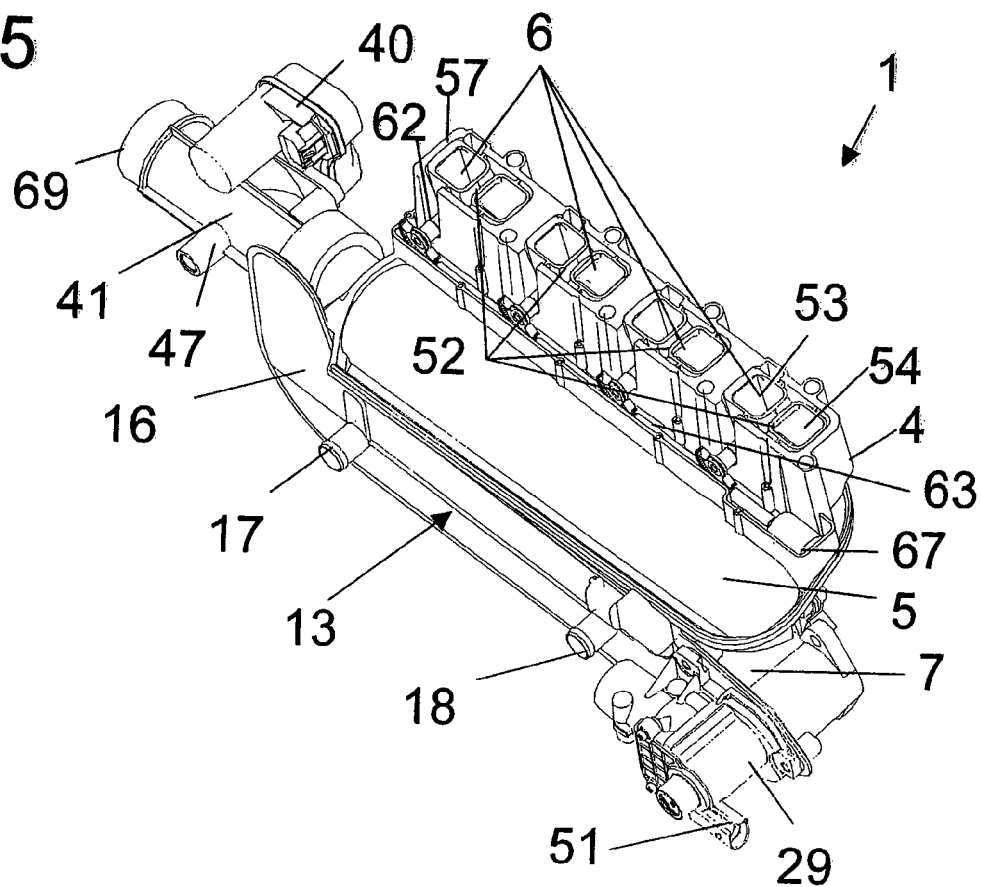
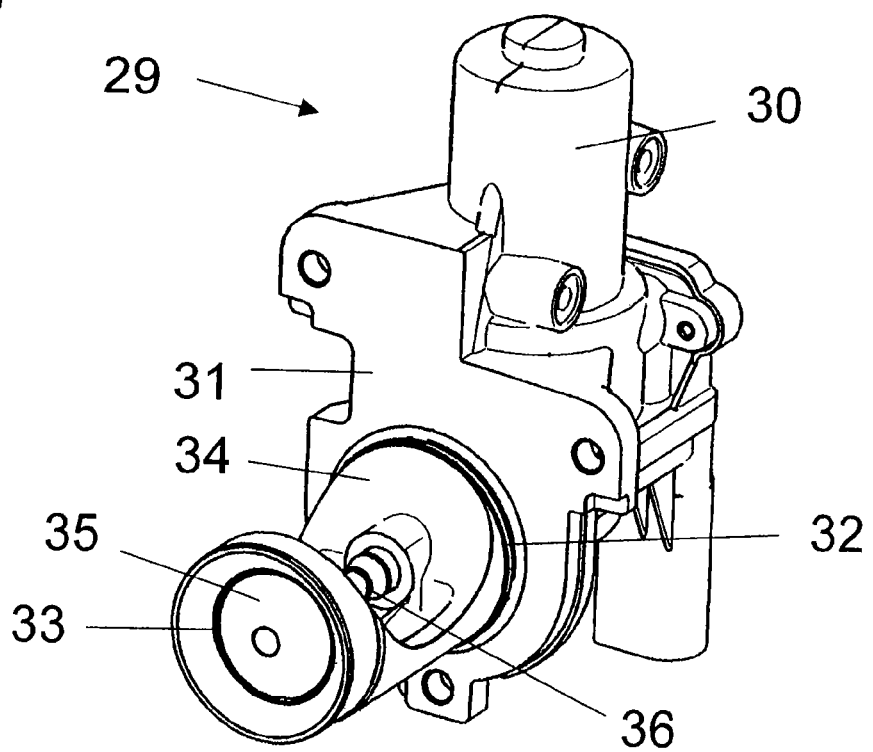

AIR-INTAKE DUCT SYSTEM FOR A COMBUSTION ENGINE

This is a National Phase Application in the United States of International Patent Application No. PCT/EP2004/009713 filed Sep. 1, 2004, which claims priority on German Patent Application No. DE 103 41 393.6, filed Sep. 5, 2003. The entire disclosures of the above patent applications are hereby incorporated by reference.

FIELD OF THE INVENTION

The invention relates to an air-intake duct system for a combustion engine.

BACKGROUND OF THE INVENTION

Air-intake duct systems for combustion engines, exhaust gas recirculation valves, exhaust gas coolers, exhaust gas feeding devices, and throttle valves and their function are generally known and are described in a large number of patent applications. In recent years attempts have been made to better match the individual parts of a total intake system and exhaust gas recirculation system and to make available complete units from one source in the smallest possible installation space.

A corresponding system is described, for example, in the not yet published patent application with the file number 102 28 247. In this document, the intake pipe taught is connected via a distributor plate to an exhaust gas cooler, an exhaust gas feeding device, an exhaust gas recirculation valve, and a throttle valve, so that a compact unit is formed. In the production of such an air-intake duct system, however, all the individual parts must still be connected together via flanges and each individual part must be produced with a stand-alone housing. Thus, the exhaust gas recirculation valve features a duct-forming housing and the throttle valve device features a duct-forming throttle valve connector that is connected only to the distributor plate of the system. Accordingly, this air-intake duct system has a relatively high weight and many assembly steps are needed to connect the individual parts. Moreover, there is no integration of all the known devices to reduce pollutants or fuel consumption.

In the not yet published patent application with the file number 103 21 533, an air-intake duct system is disclosed in which an exhaust gas cooler is integrated into the exhaust gas recirculation duct, which is embodied in one piece with the intake pipe housing. Although such an embodiment reduces the number of production steps, it has the disadvantage that the exhaust gas is conducted through the cooler in each operating state of the combustion engine and an integration of further components is not provided.

Based on these documents, it is the object of the invention to present an air-intake duct system that features pre-mounted units matched to one another, which can be integrated into one another. Moreover, compared to known air-intake duct systems, assembly and production steps are to be saved and a further cost reduction, as well as a weight reduction, are to be achieved. An integration of additional components to reduce pollutants and fuel consumption is to be implemented. The air-intake duct system is to be embodied such that the attachments can be used for different engines, so that production and development costs can be reduced through a modular construction.

SUMMARY OF THE INVENTION

This object of the invention is achieved in that the air-intake duct system features a housing with an upper shell and a lower shell that when connected to one another form an intake plenum duct and individual air inlet ducts leading to cylinders of the combustion engine, whereby the air-intake duct system features an exhaust gas recirculation valve, an exhaust gas recirculation duct, an exhaust gas cooler, and an exhaust gas feeding device via which exhaust gas can be fed into the intake plenum duct of the air-intake duct system, and a throttle valve via which the amount of intake air can be regulated, which shells are connected permanently to the air-intake duct system, whereby the exhaust gas recirculation duct is essentially produced in one piece with one shell of the air-intake duct system and the exhaust gas recirculation valve and the throttle valve are embodied as plug-in valves that can be plugged into corresponding openings of the housing. Through such a system that integrates a number of components, a reduction in the number of components and in the total weight of the air-intake duct system is achieved because no additional housings need to be produced for the throttle valve or the exhaust gas recirculation valve. With a uniform design of the openings, identical plug-in valves can be used for different combustion engines.

A further integration, in particular for pollutant reduction, is achieved in that the exhaust gas recirculation duct is divided in the direction of flow by a dividing wall essentially into two parallel ducts open on one side perpendicular to the flow direction, whereby the first duct serves as a cooling duct and the second duct serves as a bypass duct, and the housing of the exhaust gas recirculation duct features an opening into which a bypass valve that is embodied as a plug-in valve can be plugged. Through the division of the exhaust gas recirculation duct into the cooling duct and the bypass duct, optimized exhaust gas temperatures can be achieved with the aid of the bypass valve, according to the operating state of the combustion engine. The cold start and warm-up periods of the engine are hereby shortened. The embodiment of the bypass valve as a plug-in valve entails a further integration with simultaneous weight and production cost reduction.

In a preferred form of embodiment, the exhaust gas recirculation duct and the dividing wall are embodied in one piece with the upper shell of the air-intake duct system, and the openings for the corresponding plug-in valves are likewise arranged in the upper shell. Thus, the upper shell of the air-intake duct system forms the position of installation for all the stated attachments, which leads to a simplified assembly. Because the exhaust gas recirculation duct, dividing wall, and upper shell are in one piece, additional components or production steps are saved.

In a further embodiment, the plug-in valves are pre-mounted with their actuating elements, which feature corresponding connecting plugs, and after they have been plugged into the openings, an air-tight connection to the housing can be produced via attachment flanges of the valves. This embodiment emphasizes the modular construction of this air-intake duct system, in which the valves with their actuating elements can be completely pre-mounted and only then are plugged into the housing and connected to it. Through a matching embodiment of the attachment flanges, or through seals that are, for example, additionally sprayed onto the plug-in valves, a leak-free connection to the housing is formed so that no infiltrated air can reach the air-intake duct system via the attachments. Furthermore, the assembly is simplified due to the fact that the position for attaching the plug-in valves is determined by the openings.

In a preferred form of embodiment, the exhaust gas cooler features a heat transfer unit and a lid part, whereby the heat transfer unit is arranged in the cooling duct, a flange plate that closes at least the open side of the cooling duct and features a cooling fluid duct through which cooling fluid flows, which duct is embodied open on one side perpendicular to the flow direction, and whereby the lid part closes the cooling fluid duct and features a cooling fluid inlet connection and a cooling fluid outlet connection, and the flange plate or the lid part simultaneously close the open side of the bypass duct. This embodiment ensures good accessibility during the assembly of the exhaust gas cooler and good heat transfer due to the position of the heat transfer unit in the cooling duct.

Furthermore, it is advantageous to produce the heat transfer unit in one piece with shape elements of a flow conducting body that, with the housing of the intake plenum duct, forms the exhaust gas feeding device through which the number of components is again reduced and an optimized feeding of the exhaust gas into the intake plenum duct is ensured.

In a further embodiment of the invention, the bypass valve features its actuating element, a drive shaft that can be activated by the actuating element, a valve body connected permanently to the shaft, and the attachment flange, which flange features a shoulder corresponding to the opening of the exhaust gas recirculation duct and engaging in this opening, whereby this shoulder features two stops by means of which the end positions of the valve body are determined. Such a bypass valve can be tested separately before installation and can be equipped with a simple and inexpensive open/closed actuating element based on the mechanically determined end positions.

In a further embodiment of the invention, charge movement valves are arranged in the lower shell of the air-intake duct system in the air inlet ducts leading to the individual cylinders, as a result of which the charge movement of the intake air can be optimized, which leads to a better EGR (Exhaust Gas Recirculation) compatibility and improved combustion.

In another preferred embodiment, the shape of the charge movement valves is flow-optimized and arranged such that the flow resistance is as low as possible. To this end the valves can, for example, disappear into the corresponding walls of the air-intake duct system in their opened position so that, essentially, the duct in this state is extended by means of the valve without interruption. Simultaneously, the valve should be embodied so that an interruption-free extension also takes place in the corresponding closed position of the valves so that smaller charge change losses arise in both positions.

A further improvement of the combustion in the cylinders is achieved in that the air inlet ducts in the lower shell leading to the individual cylinders each feature a dividing wall in their end area, viewed in the direction of flow, which dividing wall divides each duct into two duct parts, whereby at least one duct part can be governed by respectively one of the charge movement valves.

In another preferred form of embodiment of the invention, the dividing wall is arranged respectively in an insert so that the latter produces the division into the two duct parts, whereby the insert is plugged into the air inlet ducts of the lower shell at least with positive engagement and its outer walls essentially lie adjacent to the inner walls of the air inlet ducts, and the charge movement valves are arranged in the insert. Through these inserts, which can be made for example of plastic, the production of the lower shell is considerably facilitated so that the dividing wall can be made available at minimum production expense.

In a further form of embodiment, each insert features a hole through which an activating shaft extends on which one of the charge movement valves is arranged, respectively, whereby the activating shafts extend outwards respectively through corresponding recesses in the lower shell where they are each permanently connected to a segment gear, whereby all the gearwheel segments are in operative connection with a shaft embodied as a worm shaft at least in the area of the gearwheel segments, which shaft can be set in rotational motion by means of an actuating device so that the actuating device drives all the charge movement valves synchronously via the worm shaft and the gearwheel segments. Alternatively, gear segments linearly activated by a gear rack can also be used. The displacement via the worm shaft enables a very accurate displacement of the charge movement valves and simultaneously offers a long service life of the actuating device. At the same time, the assembly expense is minimized and a synchronous displacement of the valves is ensured by means of the control with only one actuating device.

In another further form of embodiment, the activation shafts extend outwards into a duct open on one side in which the gearwheel segments, the worm shaft, and optionally the actuating device are arranged, whereby the duct open on one side is embodied in the lower shell and is closed by a lid, by which means the entry of contaminants is prevented so that the service life of the entire actuating device is increased and errors can be excluded to a great extent.

The dividing walls can be arranged thereby both horizontally so that the charge movement valves serve as tumble valves, or, alternatively, can be arranged vertically so that each of the two ducts corresponds to one inlet valve of the cylinder, respectively, and the charge movement valves serve as swirl valves. Both embodiments lead to an improved combustion.

Advantageously both the upper and lower shell and the heat transfer unit are made by die casting, preferably aluminum die casting, by means of which a distinct reduction in weight occurs and a corrosion-resistant material with high heat conductivity is made available.

In a further form of embodiment, the housing of the air-intake duct system features an opening in which an air mass sensor is arranged so that, within a completely available air-intake system, all necessary units can be offered matched to one another.

Due to the great integration of all components, cost advantages arise through the lack of intersections and supports as well as the low amount of mechanical finishing work required. This air-intake duct system excels in its weight, which is distinctly reduced in comparison with known embodiments, through which a reduced fuel consumption arises. Additionally an improved exhaust gas quality is achieved. Through this integrated module, the extent of testing at the customer's site is also distinctly reduced since only a testing of the entire module is necessary. The plug-in valves can be used for different engines without further adjustment, which reduces production and development costs. Since the individual parts are optimally matched to one another, the assembly of the total system is extremely facilitated and thus costs are additionally reduced.

BRIEF DESCRIPTION OF THE DRAWINGS

An air-intake duct system according to the invention, as well as the individual parts required for this system, are shown in the drawings and are described below.

FIG. 5 shows in a perspective view, a lower shell of the air-intake duct system from the direction of the later attachment side at the cylinder head.

FIG. 6 shows an exhaust gas recirculation valve of the air-intake duct system according to the invention in a perspective view.

DETAILED DESCRIPTION OF THE INVENTION

Figure 1:
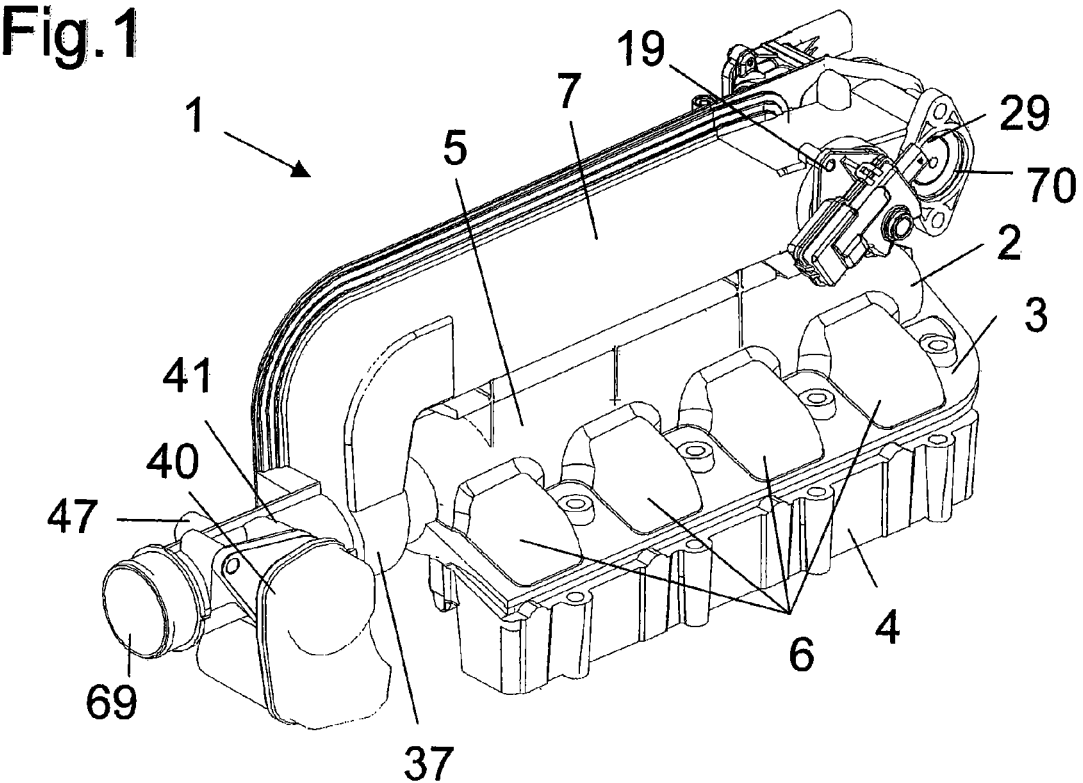
FIG. 1 shows an air-intake duct system according to the invention in the assembled state in a perspective view.

The air-intake duct system 1 according to the invention shown in FIG. 1 features a two-part housing 2 comprising an upper shell 3 and a lower shell 4, which shells are welded together during assembly, e.g. via the friction stir welding method. In the assembled state the upper shell 3 and the lower shell 4 form an intake plenum duct 5 and individual air inlet ducts 6 leading to the cylinders of a combustion engine, whereby in the present exemplary embodiment an air-intake duct system 1 for a four-cylinder combustion engine with two inlet valves per cylinder is shown, so that four air inlet ducts 6 are shown.

Figure 3:
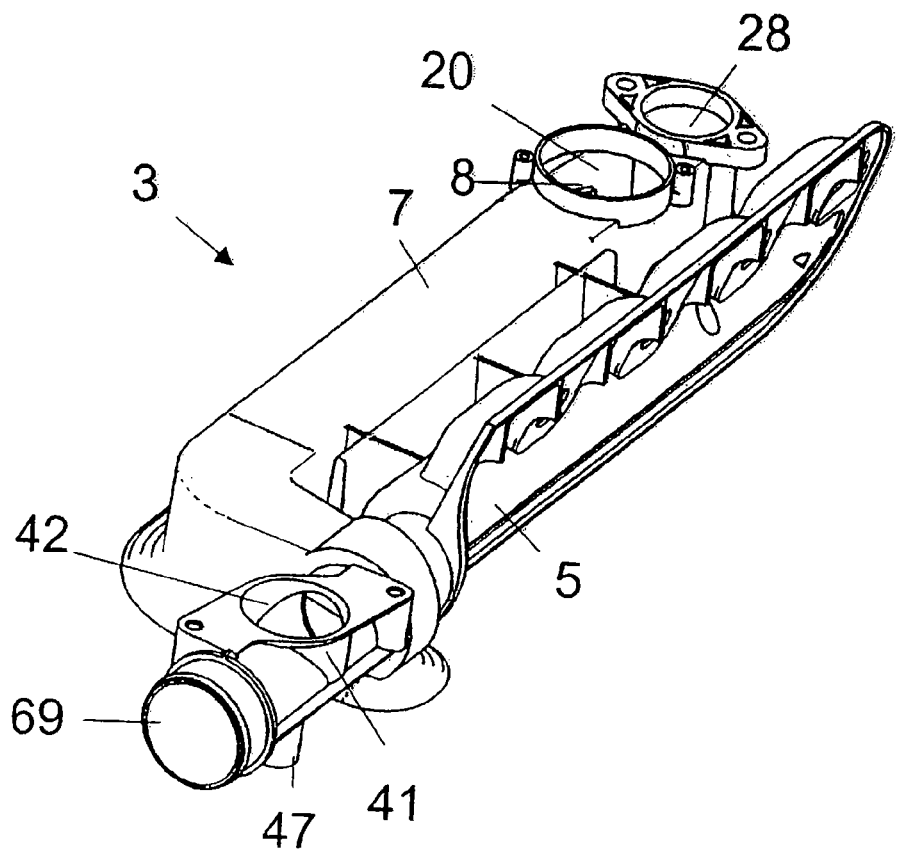
FIG. 3 shows the upper shell of the air-intake duct system of the invention in a perspective view.
Figure 10:
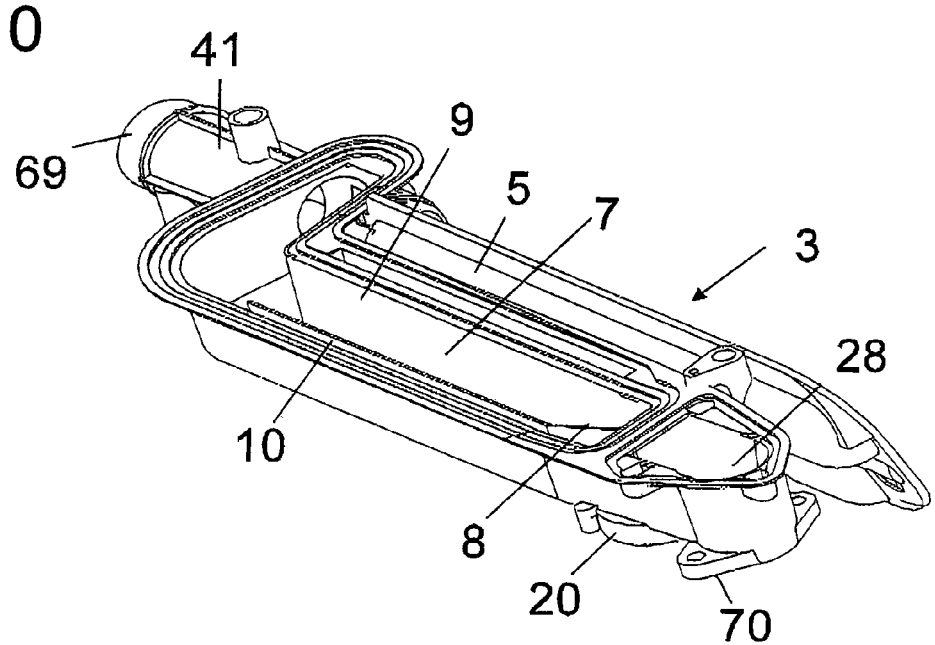
FIG. 10 shows a further view of the upper shell according to FIG. 3 in a perspective view.

The upper shell 3 shown in FIG. 3 is produced by the aluminum die casting method and features, in addition to the ducts 5, 6 partially embodied therein, an exhaust gas recirculation duct 7 open on one side perpendicular to the flow direction, which duct is produced in one piece with the upper shell 3, so that additional supports are omitted, as a result of which the number of intersections is reduced. In addition, finishing work steps can be saved. As can be seen from FIG. 10, the exhaust gas recirculation duct 7 is divided into two ducts by a dividing wall 8 along its direction of flow, whereby the first duct serves as a cooling duct 9 and the second duct serves as a bypass duct 10. In the assembled state an exhaust gas cooler 11 is arranged in the cooling duct 9, which cooler is shown in more detail in FIG. 8.

The exhaust gas cooler 11 is composed essentially of a heat transfer unit 12 in which a cooling liquid duct 13 open on one side perpendicular to the flow direction is embodied. The heat transfer takes place from this cooling liquid duct 13 via a number of fins 14, which ensure a good heat transfer to the exhaust gas in the cooling duct 9. In addition, the heat transfer unit 12 features an upper flange plate 15 that when inserted into the upper shell 3 closes the open side of the cooling duct 9 and the bypass duct 10. The heat transfer unit 12 is fixed to the upper shell 3, again using the welding method. A lid part 16 closes the open side of the cooling liquid duct 13. The lid part also features an inlet connection 17 and an outlet connection 18 for the cooling liquid as shown in FIG. 5.

Figure 4:
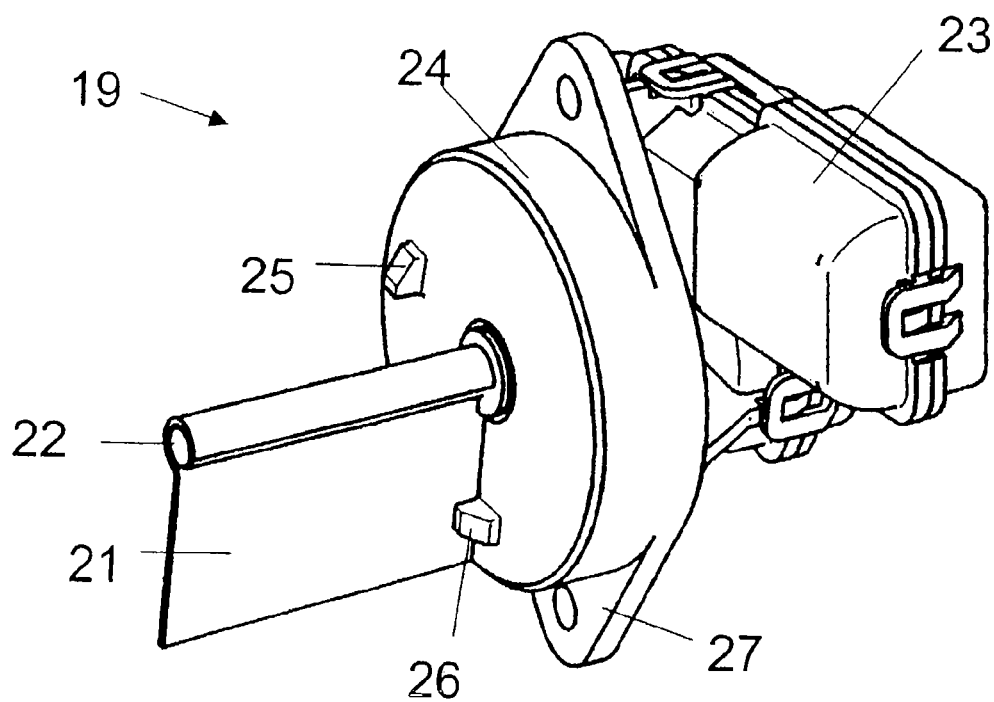
FIG. 4 shows an embodiment of a bypass valve for installation in the air-intake duct system.

Switching between the cooling duct 9 and the bypass duct 10 for the flow of the exhaust gas takes place via a bypass valve 19, which is embodied as a plug-in valve and can be plugged into a corresponding opening 20 of the upper shell 3 of the air-intake duct system 1. The position of the bypass valve 19 in the assembled state can be seen in FIG. 2. The bypass valve 19 is also shown in FIG. 4. It comprises a valve body 21, which can be rotated via a drive shaft 22. The drive shaft 22 is driven via an actuating element 23, which can either be embodied as a simple open/closed control or can implement intermediate positions, so that the exhaust gas temperature could be regulated more precisely. A simple open/closed control is shown here, whereby on a shoulder 24, which is arranged in the opening 20 during the assembly, two stops 25, 26 are arranged that determine the respective end positions of the valve 21. Between the actuating element 23 and the shoulder 24, an attachment flange 27 is arranged that comes to rest on the housing 2 of the upper shell 3 and via which the bypass valve 19 is fixed to the upper shell 3 by means of screws. It should be noted that a different fixing method would also be possible.

It can be seen from FIG. 3 that another opening 28 is embodied in the upper shell 3 immediately adjacent to the opening 20 for the bypass valve 19, into which opening an exhaust gas recirculation valve 29 that controls the exhaust gas recirculation flow is plugged during the assembly of the air-intake duct system. The corresponding position of the exhaust gas recirculation valve 29 can again be seen from FIG. 2.

The exhaust gas recirculation valve 29, according to FIG. 6, is driven by an electromotive actuating element 30 and is likewise embodied as a plug-in valve featuring an attachment flange 31 via which the exhaust gas recirculation valve 29 is fixed after it has been plugged into the upper shell 3. An additional seal 32, which is arranged on the exhaust gas recirculation valve 29, thereby ensures a tight seal of the exhaust gas recirculation duct 7 at the mounting site. The exhaust gas recirculation valve 29 is a known exhaust gas recirculation valve, whereby a valve seat 33 is embodied on a housing 34 of the exhaust gas recirculation valve 29 forming a partial duct, whereby the valve seat 33 is in operative connection with a valve plate 35. As usual, the valve plate 35 is connected to a valve rod 36 that is driven by the actuating element 30. The amount of exhaust gas fed into the exhaust gas recirculation duct 7 is correspondingly controlled by the position of the valve plate 35.

Figure 2:
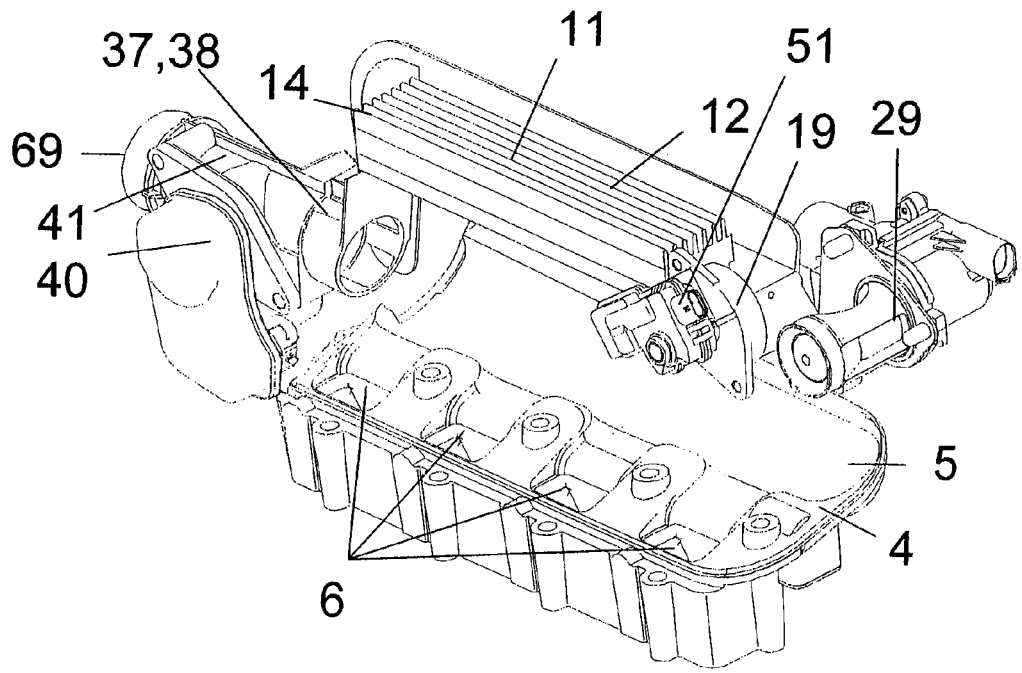
FIG. 2 shows in a perspective view, the air-intake duct system according to the invention from FIG. 1 in the assembled state, whereby the upper shell has been cut out with the exception of the area in which the throttle valve is arranged.
Figure 8:
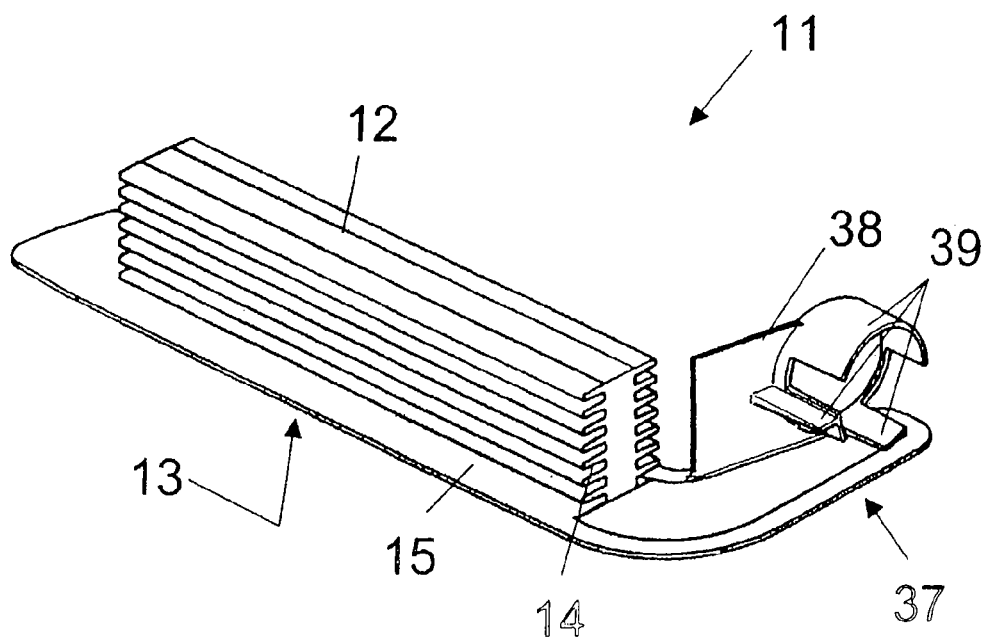
FIG. 8 shows a heat transfer unit of the air-intake duct system according to the invention in a perspective view.

Thus, the exhaust gas travels via the exhaust gas recirculation valve 29, the bypass valve 19, and the exhaust gas cooler 11 or along the bypass duct 10 via an exhaust gas feeding device 37 into the intake plenum duct 5, where it mixes with fresh air. The exhaust gas feeding device 37 comprises a flow baffle 38 that is formed by individual shape elements 39 and in the present exemplary embodiment is embodied in one piece with the heat transfer unit 12, as can be seen in FIGS. 2 and 8. The flow baffle 38 in the present example is essentially annular, whereby the individual shape elements 39 are essentially embodied as ring sections. The exhaust gas feeding device 37 is completed by an annular duct embodied between the housing 2 of the upper shell 3 and the flow baffle 38, whereby one of the shape elements 39 of the flow baffle 38 is embodied such that the exhaust gas is conducted into this annular duct from where it can flow into the intake plenum duct 5 through openings between the shape elements 39. These shape elements 39 are arranged such that an optimum mixing with the freshly drawn-in air takes place.

Figure 7:
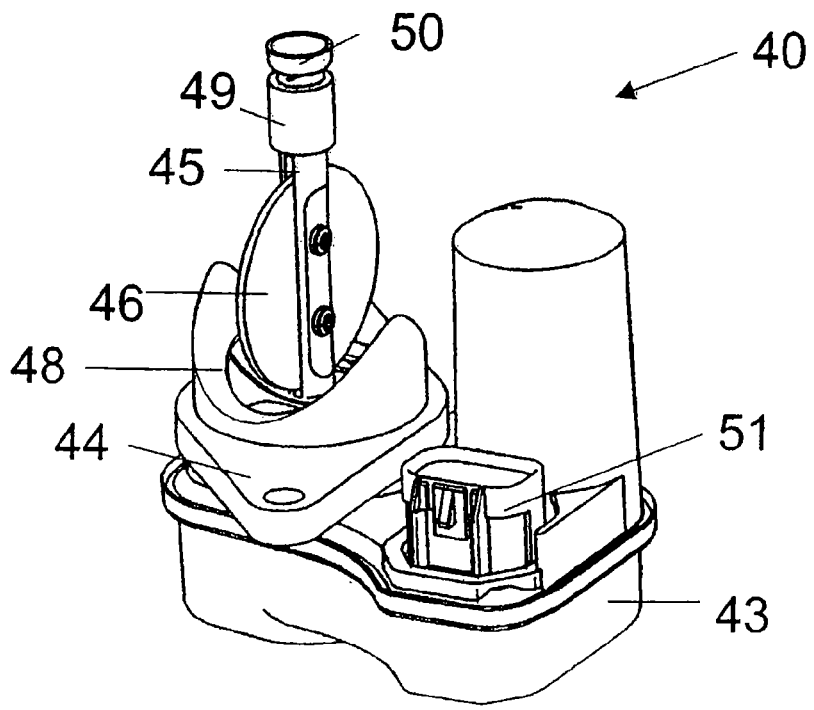
FIG. 7 shows a throttle valve of the air inlet duct system according to the invention in a perspective view.

The amount of freshly drawn-in air, or the intake pipe pressure, is regulated via a throttle valve 40. The associated throttle valve connection 41 is produced in one piece with the upper shell 3. Thus, at the corresponding position on the upper shell 3, the housing 2 features an additional opening 42 into which the throttle valve 40 embodied as a plug-in valve can be plugged. Such a throttle valve 40 is shown in FIG. 7. It is driven via an electromotive actuating element 43. The plug-in valve is again fixed to the upper shell 3 via an attachment flange 44. As is known, the actuating element 43 drives a throttle valve shaft 45 on which a throttle valve body 46 is arranged. On the side of this shaft 45 facing away from the actuating element 43, it is supported via a corresponding bearing point 47 embodied in the upper shell 3. Based on its embodiment as a plug-in valve, this throttle valve device 40 features a partial-duct-forming housing part 48 that matches the shape of the throttle valve body 46 or the inner duct shape of the throttle valve connection 41 embodied in the upper shell 3 in such a way that when the valve 40 is opened, the duct is essentially extended without interruption. The bearing 49 arranged in the bearing point 47 of the upper shell 3 and a corresponding seal 50 for preventing the intake of infiltrated air can likewise be seen in FIG. 7.

All the actuating elements 23, 30, and 43 mentioned feature, respectively, connecting plugs 51 to the plug-in valves, via which the connection is provided, for example, to an engine control.

FIG. 5 shows the lower shell of the air-intake duct system 1. The individual air inlet ducts 6 leading to the cylinders of the combustion engine are here divided respectively into paired duct parts 53, 54 by means of a dividing wall 52, whereby the division into the two duct parts 53, 54 is produced by means of an insert 55 for each individual air inlet duct 6. The dividing walls 52 are also arranged respectively in the inserts 55, which can be seen in FIG. 9. The inserts 55 are plugged into the air inlet ducts 6 from the later cylinder head side, where they rest with at least positive engagement with their respective outer walls 56 essentially at the inner walls 57 of the air inlet ducts 6. An additional positive engagement fixing is carried out via projections 58 that are embodied on the inserts 55. The dividing walls 52 shown here divide the air inlet ducts 6 respectively in the vertical direction, so that one duct is assigned to each inlet valve of the four-cylinder combustion engine. Four charge movement valves 59 are arranged in the inserts 55, which valves are embodied in the present case as swirl valves. In the case of a division of the air inlet ducts 6 with a horizontally arranged dividing wall 52, it would be possible to arrange valves correspondingly to produce a tumble. Each charge movement valve 59 can respectively open or close the duct part 54, by which means a swirl is optionally produced in the cylinder, since air reaches the combustion chamber only via an inlet valve.

Figure 9:
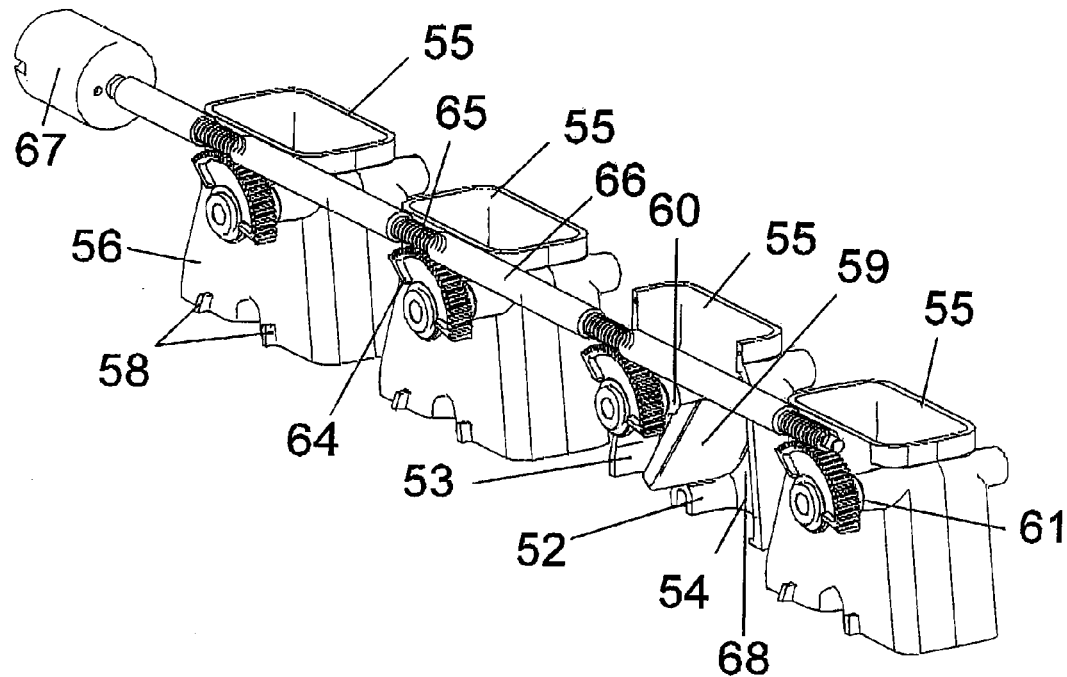
FIG. 9 shows an arrangement of air movement valves as well as their actuating device in their inserts.

Each charge movement valve 59 is respectively arranged, according to FIG. 9, on an actuating shaft 60 that extends through a hole 61 in the inserts 55. The actuating shafts 60 can be supported thereby either, as shown, in the inserts 55 or in corresponding bearing points of the upper shell 3. As can be seen from FIG. 5, the actuating shafts 60 extend through a recess 62 in the lower shell 4 into a duct 63. A segment gear 64 is arranged here at the respective end of the actuating shafts 60 and permanently connected to it, which gear 64 is in operative connection with a shaft 66 embodied in areas as a worm shaft 65. This shaft 66 is driven by an actuating device 67 that is arranged in the duct 63 with the segment gear 64, the shaft 66, and the ends of the actuating shafts 60. This duct 63 can be closed by a lid, not shown here, so that no contaminants can penetrate into the drive area of the charge movement valves 59. It should also be noted that the charge movement valves 59 are embodied such that they feature a flow-optimized shape. This means that one duct inner wall of the inserts 55 features a recess 68 in which the charge movement valve 59 rests in its opened state in such a way that the flow in the duct 6 runs without interruption, since the duct 6 is lengthened essentially smoothly by means of the adjacent valve 59. At the same time, any undesired turbulence or flow interruptions are prevented even with the closed position of the charge movement valve 59, since an edge-free transition is ensured between the walls of the insert 55 via the valve 59 to the dividing wall 52 as a result of the shape of the valve 59.

In addition to the attachment parts mentioned, a further opening can be embodied in the housing 2, in which an air mass sensor, not shown here, can be arranged.

The function of the total air-intake duct system 1, and the positions of the various attachment parts, are explained below by way of example for the various load areas of a gasoline engine.

Fresh air reaches the air-intake duct system 1 via an intake connection 69. In accordance with the gas pedal position selected by the driver of the vehicle, the opening angle of the throttle valve 40 is regulated so that an amount of air dependent on the position of the throttle valve 40 flows into the intake plenum duct 5. Immediately behind the throttle valve, seen in the direction of flow, is the exhaust gas feeding device 37. Exhaust gas flows into the intake plenum duct 5 via the openings between the shape elements 39 of the exhaust gas feeding device 37, where it mixes with the fresh air. The mixture flows farther through the intake plenum duct 5 into the four air inlet ducts 6, from where the air flows via the inserts 55 to a cylinder head, not shown. Depending on the position of the swirl valves 59, the air either reaches the cylinder head via both duct parts 53, 54, or if the air movement valve 59 is closed, only via the duct parts 53, so that a swirl is produced in the cylinder. The corresponding displacement of the charge movement valve 59 is carried out via the actuating device 67.

The flow of the exhaust gas takes place from an exhaust manifold, not shown, via an exhaust gas inlet 70 embodied in the upper shell 3, to the lower side of the exhaust gas recirculation valve 29. When the exhaust gas recirculation valve 29 is opened, the exhaust gas stream can flow through the exhaust gas recirculation valve 29 into the exhaust gas recirculation duct 7. It thereby depends on the position of the bypass valve 19 which, seen in the flow direction of the exhaust gas, is arranged directly behind the exhaust gas recirculation valve 29, whether the exhaust gas stream flows through the cooling duct 9 or the bypass duct 10. The shaft 22 of the bypass valve 19 is arranged in the installed state immediately at the dividing wall 8 of the exhaust gas recirculation duct 7, so that the exhaust gas stream flowing from the exhaust gas recirculation valve 29 can be diverted accordingly. Thus, the exhaust gas flows either via cooling duct 9 of the heat transfer unit 12 or through the bypass duct 10 to the exhaust gas feeding device 37, from where it can flow into the intake plenum duct 5.

The cooling liquid is simultaneously pumped preferably countercurrent from the inlet connection 17 through the cooling liquid duct 13 to the outlet connection 18 of FIG. 5.

Depending on the operating state, there are different positions of the integrated valves 19, 29, 40, 59. When the combustion engine is not in operation, the throttle valve 40 and the exhaust gas recirculation valve 29 are closed, while the swirl valves 59 and the bypass valve 19 are in the open position. During a subsequent cold start of the engine, the throttle valve 40 and the exhaust gas recirculation valve 29 are opened and the bypass valve 19 is positioned so that the exhaust gas stream flows through the bypass duct 10. The result is a rapid heating and thus the warm-up period of the engine is distinctly shortened. At the same time the catalyst starts earlier.

In the partial load range of the combustion engine, the throttle valve 40 is moved into a throttling position, i.e. a position that partially closes the duct 10, and the bypass valve 19 is activated so that the exhaust gas stream flows via the cooling duct 9. The exhaust gas recirculation valve 29 is opened thereby, while the swirl valves 59 are closed in order to produce an improved combustion.

When the combustion engine is operated under full load, the throttle valve 40 is completely opened, while the exhaust gas recirculation valve 29 is closed and the swirl valves 59 are in the fully opened position.

An optimized temperature and charge movement control are possible by means of these devices. Due to the exhaust gas cooling, the $NO_x$ emissions are reduced through the falling oxygen concentration of the cylinder charge as well as the slower combustion rate and lower combustion temperature. Moreover, the cylinder charge is improved and the thermal load of the engine components is reduced. Through the bypass, the start-up and warm-up periods can be clearly shortened, since hot exhaust gas flows back into the cylinder. Accordingly, the combustion- and engine exhaust gas temperatures rise more rapidly so that fewer HC and CO emissions are formed. The catalyst starts more quickly, so that a further reduction, in particular of the HC and CO emissions, results. The exhaust gas recirculation rate can be further increased through the possible charge movement with the swirl valves, which results in an additional reduction in the emissions.

With an opened bypass in normal operation, the operating temperature of the catalyst is maintained when the exhaust gas temperatures are too low.

In summary, an air-intake duct system is thus made available, with which future emission limits can also be achieved, because a large number of known available components for pollution and fuel consumption reduction are offered in a total system in which the individual parts are optimally matched to one another. The air-intake duct system largely manages without additional seals due to the welded connections. Additional supports, or intersections, that are difficult to handle between the induction pipe and the cooler, as well as largely necessary finishing work on the housing, are omitted. Compared to known systems, the weight of the air-intake duct system is distinctly reduced, not least by minimizing the number of parts and the weights of the individual parts.

It is clear that the shape of the individual attachments of the exemplary embodiment used can be changed, as can optionally their position in the system, without leaving the scope of the main claim. Thus, it is conceivable within the scope of the present invention to arrange, for example, the corresponding connection openings for the attachments or the exhaust gas recirculation duct in the lower shell if it is more favorable for the installation situation in the engine. The shapes needed for the upper and lower shell then change accordingly.

It should be clear to those skilled in the art that to drive the charge movement valves as required, a hot shaft or a gear rack with respective corresponding segment gears can be used.

The invention claimed is:

1. An air-intake duct system for a combustion engine, comprising a housing with an upper shell and a lower shell connected to one another to form an intake plenum duct, and individual air inlet ducts leading to cylinders of the combustion engine, whereby the air-intake duct system further comprises:
   an exhaust gas recirculation valve;
   an exhaust gas recirculation duct, wherein an amount of exhaust gas fed into the exhaust gas recirculation duct is controlled by the exhaust gas recirculation valve;
   an exhaust gas cooler arranged in the exhaust gas recirculation duct;
   an exhaust gas feeding device, disposed between the exhaust gas recirculation duct and the intake plenum duct, via which exhaust gas is fed into the intake plenum duct of the air-intake duct system; and
   a throttle valve disposed to regulate an amount of intake air, wherein the upper shell and the lower shell are connected permanently to the air-intake duct system so the exhaust gas recirculation duct is essentially produced in one piece with the housing of the air-intake duct system, and the exhaust gas recirculation valve and the throttle valve are plug-in valves that are plugged into corresponding openings of the housing.

2. An air-intake duct system according to claim 1, wherein the exhaust gas recirculation duct is divided in the direction of flow by a dividing wall essentially into two parallel ducts open on one side perpendicular to the flow direction, wherein first duct of the two parallel ducts serves as a cooling duct and a second duct of the two parallel ducts serves as a bypass duct, and a housing of the exhaust gas recirculation duct includes an opening into which a bypass valve that is a plug-in valve is plugged.

3. An air-intake duct system according to claim 2, wherein the exhaust gas recirculation duct and the dividing wall are formed in one piece with the upper shell of the air-intake duct system, and the openings for each corresponding plug-in valves is arranged in the upper shell.

4. An air-intake duct system according to claim 2, wherein each plug-in valves is pre-mounted with an actuating element comprising corresponding connecting plug, and after each plug-in valve has been plugged into the corresponding opening, an air-tight connection to the housing is produced by attachment flanges of the plug-in valves.

5. An air-intake duct system according to claim 2, wherein the exhaust gas cooler comprises
   i. a heat transfer unit and a lid part, wherein the heat transfer unit is arranged in the cooling duct; and
   ii. a flange plate disposed to close at least an open side of the cooling ducts and includes a cooling fluid duct through which cooling fluid flows, wherein the cooling duct is open on one side perpendicular to the flow direction, and the lid part is disposed to close the cooling fluid duct and includes a cooling fluid inlet connection and a cooling fluid outlet connection, and the flange plate or the lid part simultaneously close an open side of the bypass duct.

6. An air-intake duct system according to claim 5, wherein the heat transfer unit is provided in one piece with shape elements of a flow conducting body that, with the housing of the intake plenum duct, forms the exhaust gas feeding device.

7. An air-intake duct system according to claim 2, wherein the bypass valve comprises
  i. an actuating element;
  ii. a drive shaft disposed to be activated by the actuating element;
  iii. a valve body connected permanently to the drive shaft; and
  iv. an attachment flange comprising a shoulder corresponding to, and extending into, the opening of the exhaust gas recirculation duct into which the bypass valve is plugged, wherein the shoulder (24) includes two stops that determine end positions of the valve body.

8. An air-intake duct system according to claim 1, wherein a charge movement valve is arranged in each air inlet duct, leading to individual cylinders, of the lower shell of the air-intake duct system.

9. An air-intake duct system according to claim 8, wherein a shape of each charge movement valve is flow-optimized.

10. An air-intake duct system according to claim 8, wherein each air inlet duct in the lower shell of the air-intake duct system, leading to the individual cylinders, comprises a dividing wall in an end area, viewed in the direction of flow, wherein the dividing wall divides the air inlet duct into two duct parts, wherein flow through at least one duct part is governed by a respective charge movement valve.

11. An air-intake duct system according to claim 10, wherein the dividing wall is arranged respectively in an insert so that the insert divides the air inlet duct into the two duct parts, wherein each insert is plugged into the corresponding air inlet duct of the lower shell at least with positive engagement and outer walls of each insert essentially lie adjacent to inner walls of the respective air inlet duct, and the charge movement valves are arranged in respective inserts.

12. An air-intake duct system according to claim 11, wherein each insert includes a hole formed therein through which an activating shaft extends on which one of the charge movement valves is arranged, respectively, wherein each activating shaft extends outwards, respectively, through a corresponding recess formed in the lower shell, wherein each activating shaft is permanently connected to a segment gear, wherein all segment gears are in operative connection with a first shaft comprising a worm shaft at least in areas connecting with the segment gears, wherein the first shaft is disposed to be set in rotational motion by an actuating device so that the actuating device drives all the charge movement valves synchronously via the worm shaft of the first shaft and the segment gears.

13. An air-intake duct system according to claim 12, wherein the activation shafts extend outwards into a first duct open on one side in which the segment gears, the worm shaft, and the actuating device are arranged, wherein the first duct open on one side is formed in the lower shell and is closed by a lid.

14. An air-intake duct system according to claim 10, wherein the dividing walls are arranged horizontally so that the charge movement valves serve as tumble valves.

15. An air-intake duct system according to claim 10, wherein the dividing walls are arranged vertically so that each of the two duct parts corresponds to an inlet valve of one cylinder, respectively, and the charge movement valves serve as swirl valves.

16. An air-intake duct system according to claim 5, wherein the upper shell, the lower shell, and the heat transfer unit (12) are made by die casting.

17. An air-intake duct system according to claim 1, wherein the housing of the air-intake duct system includes an opening formed therein in which an air mass sensor is arranged.

18. An air-intake duct system according to claim 3, wherein each plug-in valve is pre-mounted with an actuating element comprising corresponding connecting plugs, and after each plug-in valve has been plugged into the corresponding opening, an air-tight connection to the housing is produced by attachment flanges of the plug-in valves.

19. An air-intake duct system according to claim 9, wherein each air inlet duct in the lower shell of the air-intake duct system, leading to the individual cylinders, comprises a dividing wall in an end area, viewed in the direction of flow, wherein the dividing wall divides the air inlet duct into two duct parts, wherein flow through at least one duct part is governed by a respective charge movement valve.

20. An air-intake duct system according to claim 5, wherein the upper shell, the lower shell, and the heat transfer unit (12) are made by aluminum die casting.

* * * * *